(12) United States Patent
Ho

(10) Patent No.: US 7,062,671 B2
(45) Date of Patent: Jun. 13, 2006

(54) APPARATUS AND METHOD FOR BUFFERING DATA IN A COMMUNICATION SYSTEM

(75) Inventor: Tien-Shin Ho, Shindian (TW)

(73) Assignee: Realtek Semiconductor Corp., Hsinchu (TW)

(*) Notice: Subject to any disclaimer, the term of this patent is extended or adjusted under 35 U.S.C. 154(b) by 600 days.

(21) Appl. No.: 10/160,095

(22) Filed: Jun. 4, 2002

(65) Prior Publication Data

US 2002/0188795 A1 Dec. 12, 2002

(30) Foreign Application Priority Data

Jun. 12, 2001 (TW) ............................... 90114158 A

(51) Int. Cl.
*G06F 11/00* (2006.01)

(52) U.S. Cl. ...................... 714/5; 711/150; 365/189.04
(58) Field of Classification Search .................. 714/5, 714/43, 56; 709/235; 711/150; 365/189.04, 365/198.04
See application file for complete search history.

(56) References Cited

U.S. PATENT DOCUMENTS

| | | | | |
|---|---|---|---|---|
| 5,333,301 A | * | 7/1994 | Cheney et al. | ................ 714/56 |
| 5,371,877 A | * | 12/1994 | Drako et al. | ................ 711/109 |
| 5,706,482 A | * | 1/1998 | Matsushima et al. | ....... 345/535 |
| 5,748,539 A | * | 5/1998 | Sproull et al. | ......... 365/189.04 |
| 5,818,751 A | * | 10/1998 | Ho et al. | ..................... 365/154 |
| 5,831,906 A | * | 11/1998 | Yih et al. | .............. 365/189.04 |
| 6,144,604 A | * | 11/2000 | Haller et al. | ................ 365/221 |
| 6,393,021 B1 | * | 5/2002 | Chow et al. | ................ 370/378 |
| 2004/0068633 A1 | * | 4/2004 | Engelahardt | ................ 711/167 |
| 2004/0208064 A1 | * | 10/2004 | Sohn et al. | ............ 365/189.04 |

* cited by examiner

*Primary Examiner*—Robert Beausoliel
*Assistant Examiner*—Christopher McCarthy
(74) *Attorney, Agent, or Firm*—Rabin & Berdo, P.C.

(57) ABSTRACT

An apparatus and method for buffering data in a communication system. The apparatus includes a first and a second storage unit. The first storage unit is configured to store first data in a first mode and retrieve the first data in a second mode. The second storage unit is configured to store second data in the second mode and retrieve the second data in the first mode. The apparatus also has a management logic circuit controlling the first and the second storage units to operate between the first and the second modes. In addition, the management logic circuit performs a collision process if a collision has been detected during a collision detection period.

12 Claims, 3 Drawing Sheets

APPARATUS AND METHOD FOR BUFFERING DATA IN A COMMUNICATION SYSTEM

BACKGROUND OF THE INVENTION

1. Field of the Invention

The invention relates to the field of computer communication. More particularly, the invention relates to an apparatus and method for buffering data in a communication system.

2. Description of the Related Art

Referring to FIG. 1, a buffering arrangement 12 can typically be provided between a media access control (MAC) interface logic circuit and a physical interface unit 14 in a communication system, in which the MAC logic circuit (not shown) is incorporated in control logic 10. The buffering arrangement 12 is useful for buffering a stream of data between a local bus 100 and the physical interface unit 14 which are not synchronized. For example, the local bus 100 is a 32-bit PCI bus supporting 132 Mbytes/second peak transfer rate and the physical interface unit 14 interfaces with the commonly-used 10 or 100 Mbps Ethernet. In FIG. 1, the control logic 10 and the physical interface unit 14 communicate with each other by means of a transmit enable signal TXEN and a receive enable signal RXEN thereby transferring data over data bus 11. The physical interface unit 14 can notify the control logic 10 via a collision signal COL, that a collision has been detected when two network nodes try to transmit at the same time. With control signals 16, the control logic 10 reads or writes the buffering arrangement 12 through an address/data bus 18. The control logic 10 may also access the local bus 100 via bus interface signals 102. However, the store and forward limitation of such design requires the control logic 10 to ensure that the buffering arrangement 12 completes data transfer within a period called inter-frame gap, otherwise the communication system cannot support fast back-to-back transaction.

Traditional communication systems utilize a high speed single-port static random access memory (SRAM) or a dual-port SRAM as the buffering arrangement 12 to overcome the limitation. Nevertheless, it is difficult to handle the synchronicity problem between the local bus 100 and the physical interface unit 14 if the high speed single-port SRAM in a time-sharing manner is adopted to serve as the buffering arrangement 12. In a general dual-port SRAM, if data is to be read from and written to a single memory cell (or the same address), both the read and write operations are conducted concurrently as in the case of different addresses. Although a dual-port SRAM has two access ports so that more than one system unit may directly access the memory, the layout size of such a dual-port memory cell is approximately 5~6 times the size of a single-port cell constructed using the same fabrication technology. This results in a larger chip area and, unfortunately, the cost of an integrated circuit goes up as its chip area is increased.

Accordingly, what is needed is a novel scheme for buffering data in a communication system, unencumbered by the limitations associated with the prior art.

SUMMARY OF THE INVENTION

It is an object of the present invention to provide an apparatus for buffering data in a communication system.

It is another object of the present invention to provide an efficient and economic mechanism for buffering data in a network interface controller.

The present invention is generally directed to an apparatus and method for buffering data in a communication system. In accordance with one aspect of the invention, the inventive apparatus includes a first and second storage unit. The first storage unit is configured to store first data in a first mode and retrieve the first data in a second mode. The second storage unit is configured to store second data in the second mode and retrieve the second data in the first mode. The apparatus also has a management logic circuit for driving the first and the second storage units to operate between the first and the second modes. The management logic circuit performs a collision process if a collision has been detected during a collision detection period. That is, the management logic circuit makes the first storage unit remain in the second mode if a collision occurs as transmission of the first data, or it makes the second storage unit remain in the first mode if a collision occurs as transmission of the second data.

In another aspect of the invention, a method of storage switching in a communication system is disclosed. The method of storage switching provides a first storage unit and a second storage unit to individually store and retrieve data. The first storage unit's write operation and the second storage unit's read operation are conducted concurrently in a first mode. Also, the first storage unit's read operation and the second storage unit's write operation are conducted concurrently in a second mode. If first data read from the first storage unit is transmitted successfully, the second mode switches to the first mode. Alternatively, if second data read from the second storage unit is transmitted successfully, the first mode switches to the second mode. When a collision has been detected during a collision detection period, a collision process is thus performed. The first storage unit is kept in the second mode if the collision occurs as transmission of the first data. Further, the first storage unit's write operation is disabled and the first data is held until no occurrence of collision to send out the first data. Likewise, the second storage unit is kept in the first mode if the collision occurs as transmission of the second data. In addition, the second storage unit's write operation is disabled and the second data is held. Finally, it waits until no occurrence of collision to send out the second data.

In another aspect of the invention, a data buffering method for use in a communication system provides a first storage unit and a second storage unit to individually store and retrieve data. In a first mode, first data is written to the first storage unit and second data is read from the second storage unit concurrently. In a second mode, the first data is read from the first storage unit and third data is written to the second storage unit concurrently. If a collision occurs as transmission of the second data, the second storage unit is kept in the first mode. The first mode switches to the second mode when the second data read from the second storage unit is transmitted successfully. Similarly, the first storage unit is kept in the second mode if a collision occurs as transmission of the first data. When the first data read from the first storage unit is transmitted successfully, the second mode then switches to the first mode.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
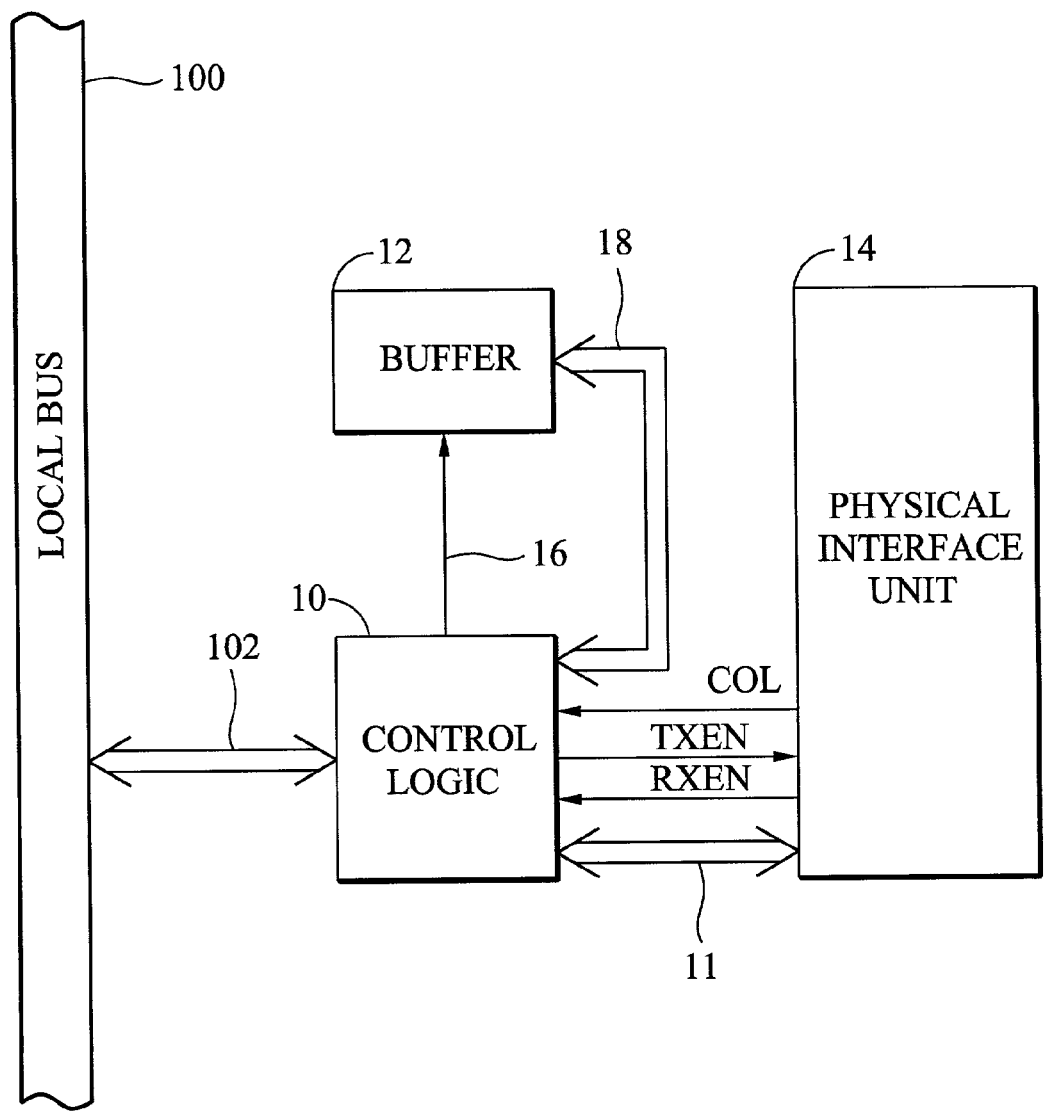
FIG. 1 is a block diagram of a buffering arrangement of a communication system according to the prior art.
Figure 2:
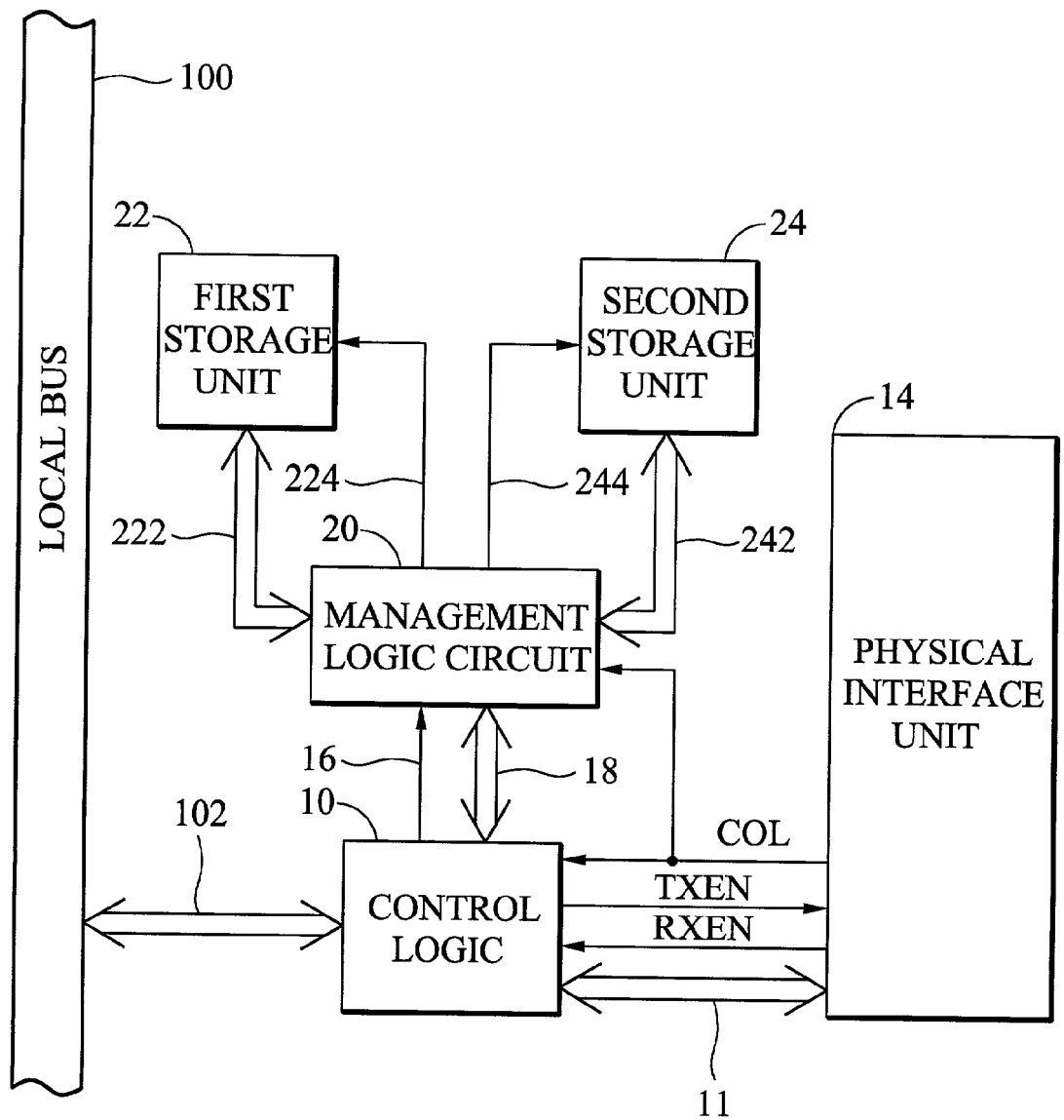
FIG. 2 is a block diagram of a buffering arrangement of a communication system according to the invention.

Referring to FIG. 2, a buffering arrangement of the invention is illustrated. Note that the same reference numbers identify similar components shown in FIGS. 1 and 2. A physical interface unit 14 and control logic 10 communicate with each other by means of a transmit enable signal TXEN and a receive enable signal RXEN thereby transferring data over data bus 11. The physical interface unit 14, via a collision signal COL, notifies a management logic circuit 20 and the control logic 10 of the presence of a collision. The collision occurs when two or more network nodes try to transmit at the same time. With control signals 16, the control logic 10 accesses the management logic circuit 20 through an address/data bus 18. Also, the control logic 10 accesses the local bus 100 via bus interface signals 102. By means of first control signals 224 and second control signals 244, the management logic circuit 20 reads/writes a first storage unit 22 and a second storage unit 24 through a first and second address/data bus 222, 242 separately. Preferably, the first and the second storage unit 22, 24 are a general single-port SRAM.

The first storage unit 22 is configured to store first data in a first mode and retrieve the first data in a second mode. The second storage unit 24 is configured to store second data in the second mode and retrieve the second data in the first mode. The management logic circuit 20 controls the first and the second storage units 22, 24 to operate between the first and the second modes. If a collision has been detected during a collision detection period, the management logic circuit 20 performs a collision process. That is, the management logic circuit 20 keeps the first storage unit 22 in the second mode if a collision occurs when attempting to transmit the first data, or it keeps the second storage unit 24 in the first mode if a collision occurs when attempting to transmit the second data. After conclusion of the first data transmission, the management logic unit 20 switches the second mode to the first mode. The management logic unit 20 also switches the first mode to the second mode after conclusion of the second data transmission. Thus, the management logic unit 20 alternately switches the first and the second modes in which it proceeds to the collision process if the collision is detected during the collision detection period. The management logic unit 20 makes it possible for the physical interface unit 14 and the local bus 100 to write data in a buffer area and read other data from the buffer area concurrently, where the buffer area is constructed of the first and the second storage units 22, 24.

Figure 3:
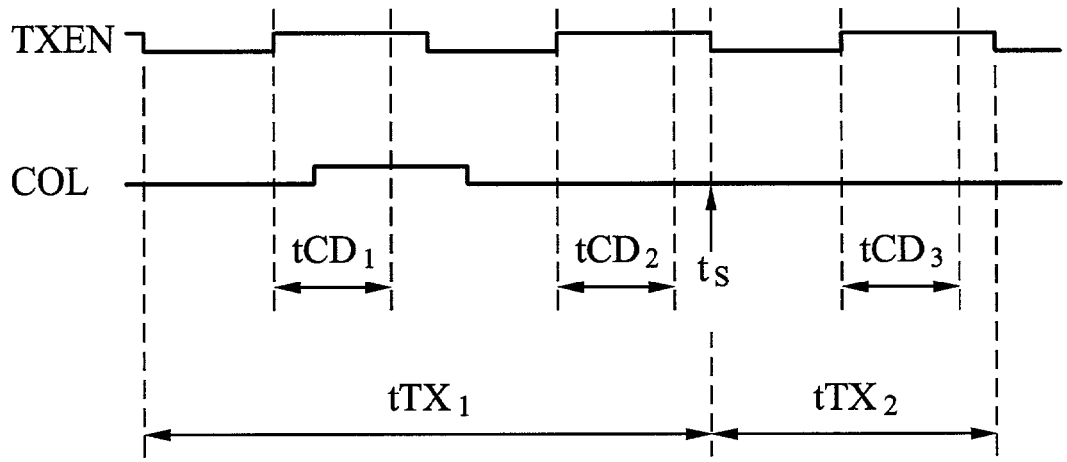
FIG. 3 is a timing diagram useful in understanding the operation of transmission according to the invention.
Figure 4:
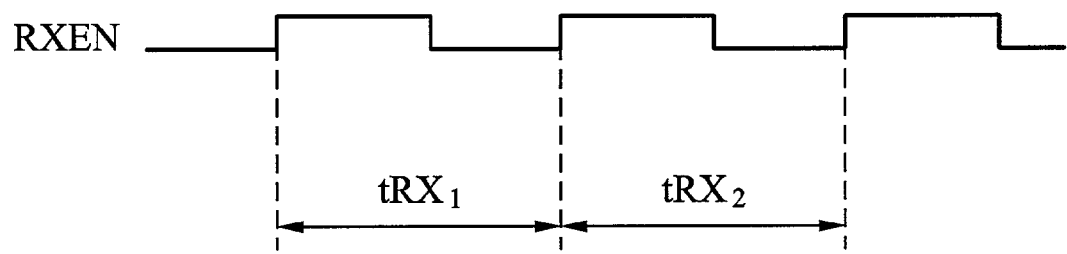
FIG. 4 is a timing diagram useful in understanding the operation of reception according to the invention.

When the control logic 10 tries to transmit, the TXEN is set to logic "1" and the control logic 10 transfers buffered data to the physical interface unit 14 over the data bus 11. Referring to FIG. 3, the management logic unit 20 permits the first and the second storage units 22, 24 to operate in the second mode during a $tTX_1$ period. The management logic unit 20 retrieves first data from the first storage unit 22 and transfers the buffered data through the address/data bus 18 to the control logic 10. At the same time, the management logic unit 20 stores next data (second data) to the second storage unit 24 through the second address/data bus 242. If the physical interface unit 14 detects a collision during collision detection period $tCD_1$, the COL is set to logic "1" in order to cause the control logic 10 and the management logic unit 20 to defer the transmission. The management logic unit 20 performs the collision process keeping the first storage unit 22 in the second mode and waiting until no occurrence of collision to send out the first data. The management logic unit 20 inhibits the first storage unit's write operation and makes it hold the first data. When the COL returns to logic "0" and no collision occurs during collision detection period $tCD_2$, the first data is then transferred to the control logic 10 to pass the buffered data to the physical interface unit 14. At tS, the management logic unit 20 switches the second mode to the first mode after conclusion of the first data transmission. Still referring to FIG. 3, the management logic unit 20 retrieves the second data from the second storage unit 24 and transfers the second data to the control logic 10 during a $tTX_2$ period. At the same time, the management logic unit 20 stores another data (third data) to the first storage unit 22 through the first address/data bus 222. If the physical interface unit 14 does not detect any collision during collision detection period $tCD_3$, the second data is transferred to the control logic 10 to pass it to the physical interface unit 14. The physical interface unit 14 finally transmits the buffered data to external network nodes over the physical medium. Accordingly, the control logic 10 can store data from the local bus 100 to the first and the second storage units 22, 24 by means of the management logic unit 20 when transmitting the buffered data. Since the local bus 100 and the physical interface unit 14 can access the buffer area constructed of the first and the second storage units 22, 24 simultaneously, and system throughput is thus increased. On data reception, the management logic unit 20 directly switches the first and the second modes without collision detection. Referring to FIG. 4, the RXEN is set to logic "1" and the control logic 10 transfers incoming data from the physical interface unit 14 over the data bus 11. The management logic unit 20 permits the first and the second storage units 22, 24 to operate in the first mode during a $tRX_1$ period. The control logic 10 transfers current received data (first data) through the address/data bus 18 to the management logic unit 20 to write the first data in the first storage unit 22. At the same time, the management logic unit 20 retrieves previously received data (second data) from the second storage unit 24 through the second address/data bus 242. The second data is then transferred to the control logic 10 to pass it to the local bus 100. After conclusion of the second data reception, the management logic unit 20 switches the first mode to the second mode. The control logic 10 transfers newly incoming data through the address/data bus 18 to the management logic unit 20 to write in the second storage unit 24 during a $tRX_2$ period. At the same time, the management logic unit 20 retrieves the first data from the first storage unit 22 through the first address/data bus 222. Thus, the control logic 10 can pass the buffered incoming data from the first and the second storage units 22, 24 to the local bus 100 by means of the management logic unit 20.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Thus, the scope of the appended claims should be accorded the broadest interpretation so as to encompass all such modifications and similar arrangements.

What is claimed is:

1. An apparatus for buffering data in a communication system, comprising:
   a first storage unit configured to store first data in a first mode and to retrieve and transmit the first data in a second mode;
   a second storage unit configured to store second data in the second mode and to retrieve and transmit the second data in the first mode; and
   a management logic circuit for controlling the first and the second storage units to operate between the first and the second modes without collision detection when receiving new data,
   wherein the management logic circuit switches to the first mode from the second mode if the first data read from the first storage unit is transmitted successfully, and switches to the second mode from the first mode if the second data read from the second storage unit is transmitted successfully.

2. The apparatus as recited in claim 1 wherein the management logic circuit performs a collision process if a collision has been detected during a collision detection period.

3. The apparatus as recited in claim 2 wherein the management logic unit performs the collision process keeping the first storage unit in the second mode and waiting until no occurrence of collision to send out the first data.

4. The apparatus as recited in claim 2 wherein the management logic unit performs the collision process keeping the second storage unit in the first mode and waiting until no occurrence of collision to send out the second data.

5. The apparatus as recited in claim 3 wherein the management logic unit switches the second mode to the first mode after conclusion of the first data transmission, in which the management logic circuit proceeds to the collision process if the collision is detected during the collision detection period.

6. The apparatus as recited in claim 4 wherein the management logic unit switches the first mode to the second mode after conclusion of the second data transmission, in which the management logic circuit proceeds to the collision process if the collision is detected during the collision detection period.

7. The apparatus as recited in claim 1 wherein the first and the second storage units are a single-port static random access memory (SRAM).

8. A method of storage switching in a communication system comprising the steps of:
   providing a first storage unit and a second storage unit to individually store and retrieve data;
   conducting the first storage unit's write operation and the second storage unit's read operation concurrently in a first mode;
   conducting the first storage unit's read operation and the second storage unit's write operation concurrently in a second mode;
   switching from the second mode to the first mode if data retrieved from the first storage unit is transmitted successfully; and
   switching from the first mode to the second mode if second data retrieved from the second storage unit is transmitted successfully,
   wherein the steps of switching from the second mode to the first mode and switching from the first mode to the second mode are performed directly without collision detection when receiving new data.

9. The method as recited in claim 8 further comprising the step of performing a collision process if a collision has been detected during a collision detection period.

10. The method as recited in claim 9 wherein the step of performing the collision process comprises:
    keeping the first storage unit in the second mode if the collision occurs as transmission of the first data;
    disabling the first storage unit's write operation and holding the first data; and
    waiting until no occurrence of collision to send out the first data.

11. The method as recited in claim 9 wherein the step of performing the collision process comprises:
    keeping the second storage unit in the first mode if the collision occurs as transmission of the second data;
    disabling the second storage unit's write operation and holding the second data; and
    waiting until no occurrence of collision to send out the second data.

12. A data buffering method for use in a communication system comprising the steps of:
    providing a first storage unit and a second storage unit to individually store and retrieve data;
    writing first data to the first storage unit and reading second data from the second storage unit concurrently in a first mode; and
    reading the first data from the first storage unit and writing third data to the second storage unit concurrently in a second mode;
    wherein the second storage unit is kept in the first mode if a collision occurs as transmission of the second data;
    wherein the first mode switches to the second mode if the second data read from the second storage unit is transmitted successfully;
    wherein the first storage unit is kept in the second mode if the collision occurs during transmission of the first data;
    wherein the second mode switches to the first mode if the first data read from the first storage unit is transmitted successfully; and
    wherein the switching between the first and second modes is performed directly without collision detection when receiving new data.

* * * * *